(12) United States Patent
Ecker et al.

(10) Patent No.: US 8,023,737 B2
(45) Date of Patent: Sep. 20, 2011

(54) METHOD AND DEVICE FOR THE SEGMENTATION OF REGIONS AND RELATED COMPUTER PROGRAM PRODUCT

(75) Inventors: Rupert Ecker, Strasshof A. D. Nordbahn (AT); Georg E. Steiner, Marchegg (AT); Vincent Laurain, Vienna (AT)

(73) Assignee: Tissue Gnostics GmbH, Vienna (AT)

( * ) Notice: Subject to any disclaimer, the term of this patent is extended or adjusted under 35 U.S.C. 154(b) by 910 days.

(21) Appl. No.: 12/019,285

(22) Filed: Jan. 24, 2008

(65) Prior Publication Data
US 2008/0193014 A1 Aug. 14, 2008

Related U.S. Application Data

(63) Continuation of application No. PCT/AT2006/000312, filed on Jul. 24, 2006.

(30) Foreign Application Priority Data

Jul. 26, 2005 (AT) ................. A 1254/2005

(51) Int. Cl.
*G06K 9/00* (2006.01)
*G06K 9/34* (2006.01)
*G06K 9/46* (2006.01)
*G06K 9/66* (2006.01)
*G06K 9/42* (2006.01)
*G06K 9/44* (2006.01)
*G06K 9/40* (2006.01)

(52) U.S. Cl. ........ 382/173; 382/128; 382/164; 382/180; 382/190; 382/257; 382/260; 382/262; 382/263; 382/264

(58) Field of Classification Search .................. 382/128, 382/164, 173, 180, 190, 257, 260, 262–264
See application file for complete search history.

(56) References Cited

U.S. PATENT DOCUMENTS
6,757,444 B2 * 6/2004 Matsugu et al. ............. 382/283
(Continued)

FOREIGN PATENT DOCUMENTS
WO 03009233 A1 1/2003
WO WO 2007012098 A2 * 2/2007

OTHER PUBLICATIONS

Laurain V et al: "Fast Automatic Segmentation of Nuclei in Microscopy Images of Tissue Sections" Engineering in Medicine and Biology Society, 2005. IEE-EMBS 2005. 27th Annual International Conference of the Shanghai, China—Sep. 1-4, 2005, Piscataway, NJ, USA, IEEE, Sep. 1, 2005, pp. 3367-3370, XP010908530 ISBN: 0-7803-8741-4.

(Continued)

*Primary Examiner* — Bhavesh Mehta
*Assistant Examiner* — Bernard Krasnic
(74) *Attorney, Agent, or Firm* — Laurence A. Greenberg; Werner H. Stemer; Ralph E. Locher

(57) ABSTRACT

A method for segmentation of locally-defined regions is provided. The input data obtained for the image region under investigation is separated into a foreground mask and a background mask, two different filter operations are applied to the input data to determine segmentation starting points, the resulting data sets are subtracted and the image regions viewed as segmentation starting points, a filter operation is applied to generate a less restrictive mask for the input data, the resulting data subjected to a threshold value reduction, the less restrictive mask subjected to a labeling with regard to determination of the local values for generation of a restrictive mask, the mean values determined, segmentation starting points not obtained in the less restrictive mask are removed, a growth into all regions of the restrictive mask is carried out and the regions obtained in the restrictive mask are viewed as the segmented brightness regions.

32 Claims, 5 Drawing Sheets

U.S. PATENT DOCUMENTS

| | | | |
|---|---|---|---|
| 7,474,775 B2* | 1/2009 | Abramoff et al. | 382/128 |
| 2002/0176625 A1* | 11/2002 | Porikli et al. | 382/173 |
| 2005/0260583 A1 | 11/2005 | Jackway et al. | |
| 2010/0183225 A1* | 7/2010 | Vantaram et al. | 382/173 |

OTHER PUBLICATIONS

Wahlby C et al: "Combinig intensity, edge and shape information for 2D and 3D segmentation of cell nuclei in tissue sections" Journal of Microscopy Blackwell Science UK, vol. 215, Jul. 2004, pp. 67-76, XP0024240876 ISSN: 0022-2720.

Clocksin W F: "Automatic segmentation of over lapping nuclei with high background variation using robust estimation and flexible contour models" Image Analysis and Processing, 2003 Proceedings. 12th International Conference on Sep. 17-19, 2003, Piscataway, NY, USA, IEE, Sep. 17, 2003, pp. 682-687, XP 010659472.

* cited by examiner

METHOD AND DEVICE FOR THE SEGMENTATION OF REGIONS AND RELATED COMPUTER PROGRAM PRODUCT

CROSS-REFERENCE TO RELATED APPLICATIONS

This application is a continuation under 35 U.S.C. §120 of copending international application No. PCT/AT2006/000312, filed Jul. 24, 2006, which designated the United States; this application also claims the priority, under 35 U.S.C. §119, of Austrian patent application No. A 1254/2005, filed Jul. 26, 2005; the prior applications are herewith incorporated by reference in their entirety.

BACKGROUND OF THE INVENTION

Field of the Invention

The invention relates to a method for the segmentation of locally defined, two-dimensional regions, preferably brightness distributions or regions or data fields, in particular for showing nuclei agglomerates or unions, particle size distribution or the like. Furthermore, the invention relates to a device for the segmentation of locally defined, two-dimensional regions, preferably brightness distributions or regions, in particular for showing nuclei agglomerates or unions, particle size distribution, data fields or the like, in particular for carrying out the method according to the invention. Finally, the invention pertains to a related computer program product.

Images of human, plant or animal cells or particles of metals or metal alloys or two-dimensional probability distribution or the like are evaluated by taking corresponding images and evaluating said images which are, in particular enlarged or shown through a microscope.

As accurately a representation as possible of the distributions, in particular brightness distributions, or their limits on the recorded images is required for the evaluation.

BRIEF SUMMARY OF THE INVENTION

It is accordingly an object of the invention to provide a method and device for the segmentation of defined regions appearing in images, in particular brightness regions, which overcomes the above-mentioned disadvantages of the heretofore-known devices and methods of this general type and which allows the recorded images or representations to be available in as good or lifelike manner as possible or to make them available for further evaluation.

With the foregoing and other objects in view there is provided, in accordance with the invention, a method for the segmentation of locally defined, two-dimensional regions, the method which comprises:

separating input data acquired from an image region under investigation into a foreground mask containing foreground data corresponding to relatively larger or higher values, and a background mask containing background data corresponding to relatively lower values by applying a threshold value;

subjecting the input data to two different filtering operations to determine segmentation starting points, with a filter reducing sharp contours or contrasts, and a filter for determining local maxima in a region;

subtracting the data sets resulting from the two different filtering operations and defining image regions having a specific threshold value or threshold value range as segmentation starting points;

generating a less restrictive mask by subjecting the input data to a filtering operation accentuating high-frequency parts or a filtering operation detecting edges, and applying a specific threshold value to the resulting data, and correlating the data set obtained therewith the data of the foreground mask;

generating a restrictive mask by subjecting the less restrictive mask to a labeling with respect to the determination of local values of each individual locally defined region or cluster, and determining median values of the respective regions, and subjecting the values obtained in each cluster to a discrimination with a preset threshold value;

eliminating segmentation starting points not contained in the less restrictive mask;

effecting a growth in the respective regions of the restrictive mask proceeding from the individual segmentation starting points;

continuing a growth of these regions in the less restrictive mask; and viewing the regions obtained in the restrictive mask as the segmented brightness regions.

In a preferred implementation of the invention, the method comprises segmenting brightness distributions for showing nuclei agglomerates or unions, or particle size distribution within a sample under investigation.

Preferably, the separating step comprises defining the foreground mask and the background mask according to brightness values. The filtering operations may include a low-pass filter and a local maximum filter, and the input data are correlated with the foreground mask. In the preferred implementation, the low-pass filter is a Gaussian filter and the input data are multiplied with the foreground mask. Preferably, the threshold value for the filtering operations is a zero value.

In accordance with the further development of the invention, the less restrictive mask is generated after a median filtration and/or a Gaussian filtration and the filtering operation detecting edges is effected with a high-pass filter. Preferably, the high-pass filter is a Laplace filter.

The labeling may be effected with respect to the determination of grey values, the median values are grey values, and the grey values in each cluster are subjected to a discrimination with a preset threshold value.

In accordance with an advantageous development of the invention, the growth may be continued in the less restrictive mask and subsequently in the foreground mask, and the regions obtained in the foreground mask may be viewed as the segmented brightness regions.

The method preferably comprises using a single or multistep dilation on the ascertained segmentation starting points.

In accordance with an added feature of the invention, the method comprises discriminating with a preset grey value when the grey values or the grey value mask is discriminated during labeling.

In accordance with an additional feature of the invention, the method comprises correlating or adjusting a filter size of the local maximum filter to a size of the Gaussian filter.

In accordance with another feature of the invention, the method further comprises:

to separate the input data, generating a diagram showing the data distribution of the input data;

calculating a differential quotient of a smoothed diagram showing the data distribution;

calculating absolute values of the differential quotients and, optionally, adding a constant value;

correlating the data thus obtained with the input data and, optionally, rescaling the data; and selecting that value as threshold value at which the function obtained corresponds to a specific threshold value or has come close to the threshold value.

Additionally, the method includes separating the input data into bright foreground data and dark background data and showing the data distribution in a brightness histogram.

Further, the method includes reproducing the representations or images and also segmented nuclei or nuclei agglomerates which are brightly colored in comparison to other cell regions or in comparison to a cytoplasm.

The method is particularly suited for segmenting colored nuclei or nuclei agglomerates contained in tissue slices.

With the above and other objects in view there is also provided, in accordance with the invention, a device for carrying out the method according to the invention, i.e., a device for the segmentation of locally defined, two-dimensional regions. The device comprises:

a discriminator connected to receive input data related to an image region under investigation and configured to separate the input data into a foreground mask containing foreground data corresponding to greater values and a background mask containing background data corresponding to lower values;

a filter unit connected to said discriminator and configured to determine segmentation starting points by subjecting the input data to two different filtrations, said filter unit including a filter for reducing sharp contours or contrasts, and a local maximum filter;

a subtraction unit connected to said filter unit for subtracting the data sets resulting from the two different filtrations, and for determining, storing, and/or making available for further calculation, the image regions having a specific threshold value or threshold value range;

a filter for generating a less restrictive mask by detecting edges or accentuating the high-frequency parts of the input data;

a labeling unit for generating a restrictive mask, said labeling unit subjecting the less restrictive mask to a labeling with respect to a determination of the local values of each individual locally defined region or cluster, and wherein the median values of the respective regions are determined, whereby the values obtained in each cluster are subjected to a discrimination with a preset threshold value;

a comparator connected to said filter and configured to remove segmentation starting points not contained in the less restrictive mask;

a growing unit connected to said comparator, said growing unit undertaking a growth in the respective regions of the restrictive mask proceeding from individual segmentation starting points, and continuing the growth of these regions in the less restrictive mask, and optionally subsequently in the foreground mask; and at least one further unit selected from the group consisting of a storage unit, a display unit, and a further evaluation unit for storing, displaying, and/or further processing the regions obtained in the restrictive mask, or in the foreground mask, as the desired segmented brightness regions.

A largely true to nature or form segmentation or representation of locally defined regions of colored images or greyvalue images is obtained with the method or device according to the invention. The data or representations obtained may be further evaluated. With greatest accuracy, the method according to the invention does not require too great a calculation expenditure and consequently quickly delivers the desired results.

To improve the representation, it can be provided that a single-step dilation is applied to the segmentation starting points determined or that, when the grey values or grey-value mask are discriminated during labeling, a discrimination with a given grey value takes place. Advantageously, to improve the image quality obtained, a data distribution diagram or a histogram, in particular a brightness histogram, of the input data can be generated to separate the input data into light foreground data and dark background data. Furthermore, the differential quotient of the smoothed diagram or histogram and the absolute values of the differential quotients are calculated and, optionally, a constant value added. The data obtained are correlated with the input data, in particular multiplied, and optionally rescaled. That value at which the function obtained assumes a specific, preset threshold value, in particular the value zero, or approaches this value, is selected as threshold value.

In particular, the method according to the invention is advantageously used when reproductions or images of nuclei or nuclei agglomerates which are dark colored vis-à-vis other cell regions or vis-à-vis the cytoplasm, or colored nuclei or nuclei agglomerates contained in tissue slices are to be segmented.

Other features which are considered as characteristic for the invention are set forth in the appended claims.

Although the invention is illustrated and described herein as embodied in method and device for the segmentation of regions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 10:
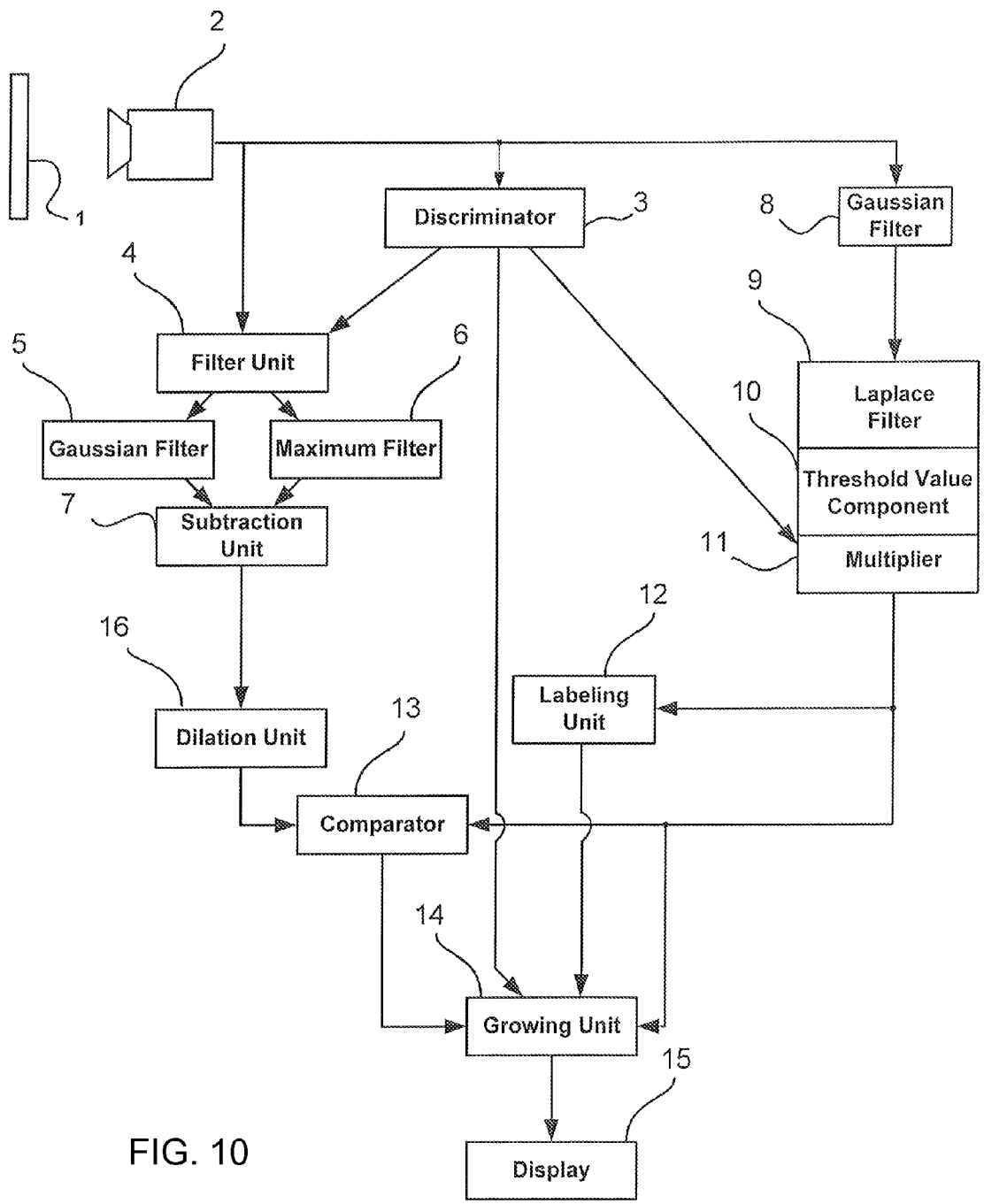
FIG. 10 is a diagram illustrating a device for carrying out the method according to the invention.

Referring now to the figures of the drawing in detail, we will first describe a device according to the invention in principle with reference to FIG. 10.

An image is taken of a tissue preparation or tissue slice 1 by means of an image-recording unit and made available according to a set of digital input data.

In a discriminator 3, the input data are separated into a foreground mask containing correspondingly high brightness values and into a background mask containing lower values by application of a brightness threshold value. The dark background data are not used any further.

The input data are fed to a filter unit 4 in which a correlation, in particular multiplication, of the input data with the foreground mask takes place. A weighted addition of the data or values or another type of association can also take place as a correlation. The output data of the filter unit 4 are fed to two different filter units, preferably, on the one hand, a Gaussian filter 5 and, on the other hand, a local maximum filter 6. Above all, low-pass filters or filters which reduce sharp contours are suitable instead of a Gaussian filter. The output data of the two filters, of the Gaussian filter 5 and local maximum filter 6 in the present case, are fed to a subtraction unit 7 in which the two data sets resulting during the respective filtrations are subtracted and which provide the data or filter regions having or approaching a threshold value, in particular the value zero, at the outlet of the subtraction unit as segmentation starting points. These segmentation starting points are also stored in the subtraction unit in order to be available for further calculations.

Furthermore, a filter detecting edges, preferably a high-pass filter, in particular a Laplace filter 9, is provided for the input data, a median filter and/or Gaussian filter 8 being connected, if necessary, upstream from said filter. A threshold value component 10 is connected downstream from the filter detecting edges a Laplace filter 9 in the present case, the data obtained through the filter 9 being subjected to a threshold value application with a specific threshold value, in particular zero, in said threshold value component 10. The zero passage of the value is an indicator for the gradient maximum, so that the differences to adjoining regions which are as good as possible can be obtained. In a correlator connected downstream from the threshold value component 10, in particular a multiplier 11, the data set obtained with the threshold value application is correlated, in particular multiplied, with the foreground mask, as a result of which a less restrictive mask is obtained.

To generate a restrictive mask, a labeling unit 12 is attached to the outlet of the correlator or multiplier 11 in which the output signals of the multiplier 11 corresponding to the less restrictive mask is carried out with respect to the determination of the local grey values of each one of the locally defined regions or clusters and the mean grey values of the respective regions are determined. Subsequently, the grey values obtained in each cluster are subjected to a discrimination with a preset threshold value. In this way, a restrictive mask is obtained.

The data set corresponding to the less restrictive mask is fed to a comparator 13 which is connected downstream from the subtraction unit 7. In the comparator 13, the segmentation starting points not contained in the less restrictive mask are removed.

In a growing unit 14, a growth takes place starting from the individual segmentation starting points in the region of the restrictive mask and, if necessary, a subsequent growth of these regions in the less restrictive mask and then optionally in the foreground mask, whereby the data sets concerning the restrictive mask are fed by the labeling unit 12 and the data sets concerning the less restrictive mask by the multiplier 11 or by a discriminator 3 of the growing unit 14.

A storage unit and/or an evaluation unit and/or a display unit 15 is connected to the growing unit 14.

A dilation unit 16 for the calculated segmentation points can be inserted between the subtraction unit 7 and the comparator 13.

A device according to the invention leads to an improvement of the results obtained with a relatively low calculation expenditure if the following elements, at least, are provided:

The discriminator comprises a diagram component showing the data distribution, in particular a histogram component, for the input data for the separation of the input data, in particular into bright foreground data and dark background data;

a differential quotient component is provided for the smoothed diagram, in particular histogram, which calculates the absolute values of the differential quotients and optionally adds a constant value;

a correlator, in particular a multiplier, is provided for linking the data obtained from the differential quotient component with the input data; and a threshold component is provided which selects that value as threshold value at which the function assumes a specific threshold value, in particular zero, or has come close to this value.

The method according to the invention will be described in greater detail by way of example in the following with reference to the segmentation of cells. To this end, cell preparations, in particular cell slices, are colored to differentiate the nuclei from the remaining cell components. Consequently, the nuclei or the nuclei agglomerates have a different color in comparison to the remaining cell components or the image background or further components contained in the tissue slice and can be localized in the recorded image. For the evaluation of the image, there is the uncertainty that the nuclei in the nuclei agglomerates are covered or not completely reproduced or the brightness regions do not have any sharp definitions or brightness values which are not easy to differentiate, i.e. chromatic values or grey values. This is to be counteracted according to the invention.

Figure 1:
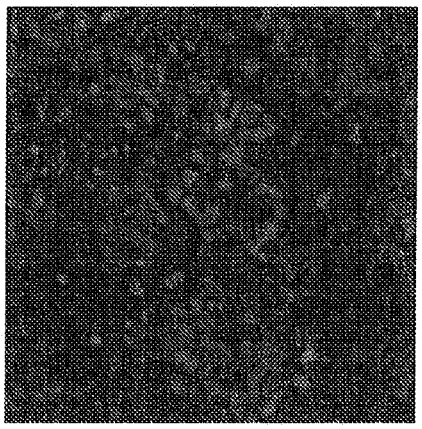
FIG. 1 shows an input data set or the regions recorded.
Figure 2:
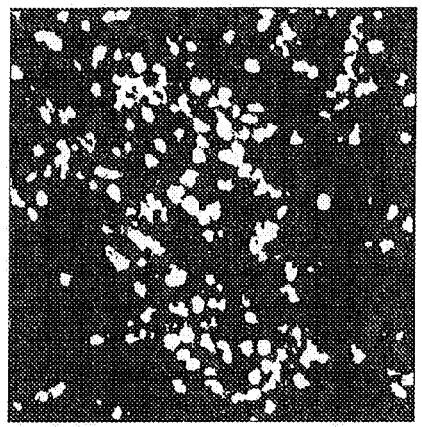
FIG. 2 shows a foreground mask or the foreground data.

Digital input data are obtained from the image region of a tissue preparation or tissue slice 1 to be examined by means of the recording unit 2. The latter may, for example, be a video camera or a microscope. By applying a selected brightness threshold value or based on a brightness threshold value which is preset or determined for said input data, the input data of the image region are separated in the discriminator 3 into a foreground mask containing foreground data and a dark background mask containing background data (step 110 of FIG. 8). FIG. 1 shows an example for an input data set. FIG. 2 shows a mask with which the background of the input data can be separated from the foreground or shows the input data set after discrimination with the preset or mathematically determined brightness threshold value.

Figure 3:
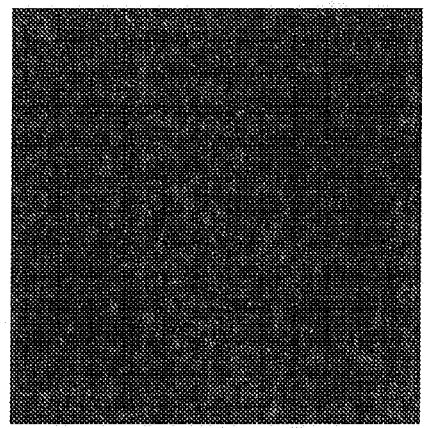
FIG. 3 shows the mask of the segmentation starting points.

To determine segmentation starting points, the foreground data or foreground mask can first be correlated, in particular multiplied, with the input data. Two different filters, e.g. both a Gaussian filter and a local maximum filter, are used beside one another in the filter unit 4 on the foreground data optionally modified in this way. The filter size of the local maximum filter is advantageously half as large as the Gaussian filter used previously on the data. The data sets resulting during these two filtrations are then subtracted in the subtraction unit 7 and the image regions meeting a threshold value criterion, in particular having the value zero, are viewed or selected as segmentation starting points. The mask or the data set of the segmentation starting points is shown by way of example in FIG. 3. The segmentation starting points are within the bright regions of the foreground mask or the segmentation starting points correspond to the bright regions of the foreground mask.

Figure 8:
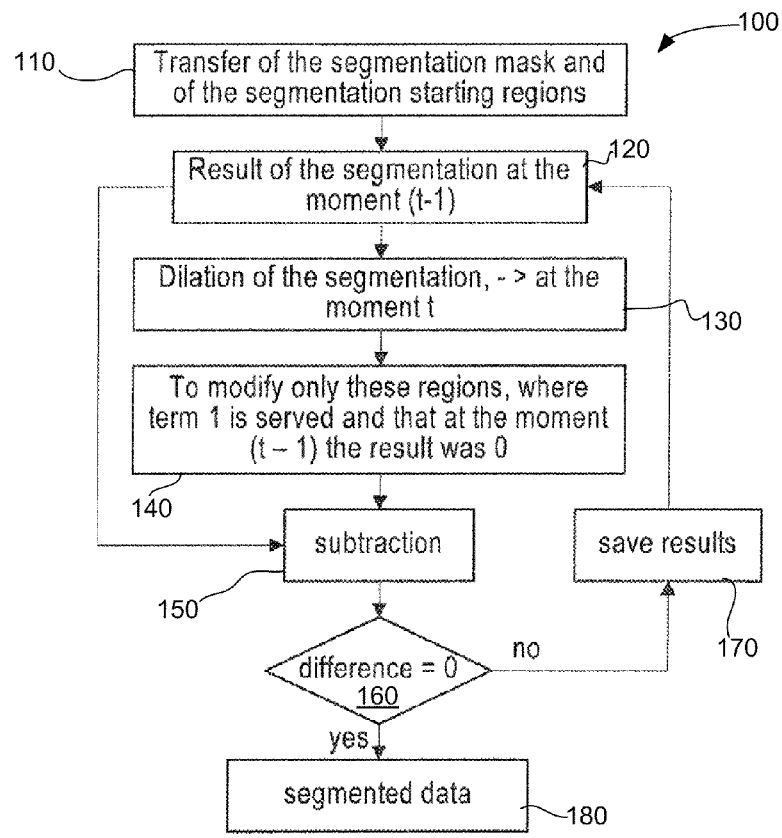
FIG. 8 shows the method during dilation of the segmentation starting points.

It is possible to use a single-step dilation on these segmentation starting points and to view the resultant point regions as segmentation starting points (step 130 of FIG. 8). It is thereby prevented that two segmentation starting points which lie close to one another will subsequently result in segmentation errors.

Two differently restrictive segmentation masks are then determined, namely a less restrictive mask and a restrictive mask.

Figure 4:
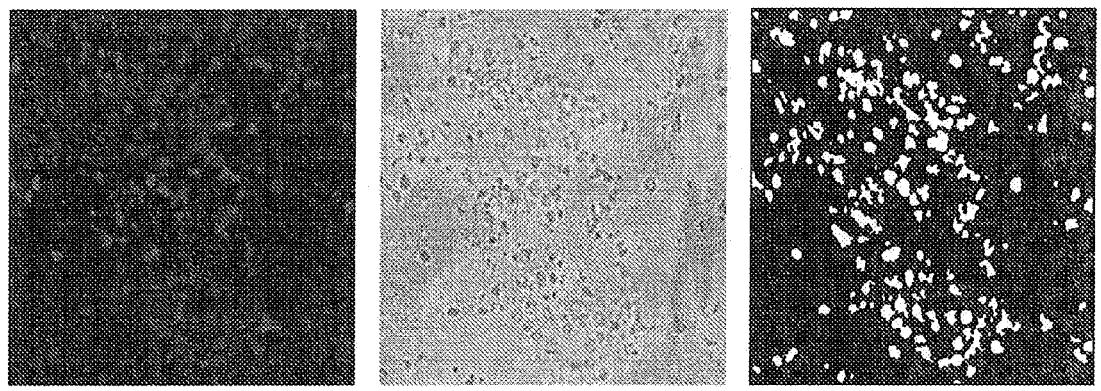
FIG. 4 shows an input data set, Laplacian and Gaussian-filtered input data and a less restrictive mask.

For this purpose, a filter detecting edges, in particular the Laplace filter 9, is first used on the input data according to FIG. 1, optionally after a median filtration and/or a Gaussian filtration. To generate the less restrictive mask, the data obtained, in particular Laplace data, are subjected to a threshold value application, in particular with the threshold value zero, and the data set thus obtained is correlated, in particular multiplied, with the data of the foreground mask. This method is shown in FIG. 4. On the left in FIG. 4, the input data of FIG. 1 are shown. In the center of FIG. 4, the Laplace and Gaussian-filtered input data are shown. On the right in FIG. 4, the restrictive mask obtained is shown. A function for closing holes in the mask can be used on this less restrictive mask.

Figure 5:
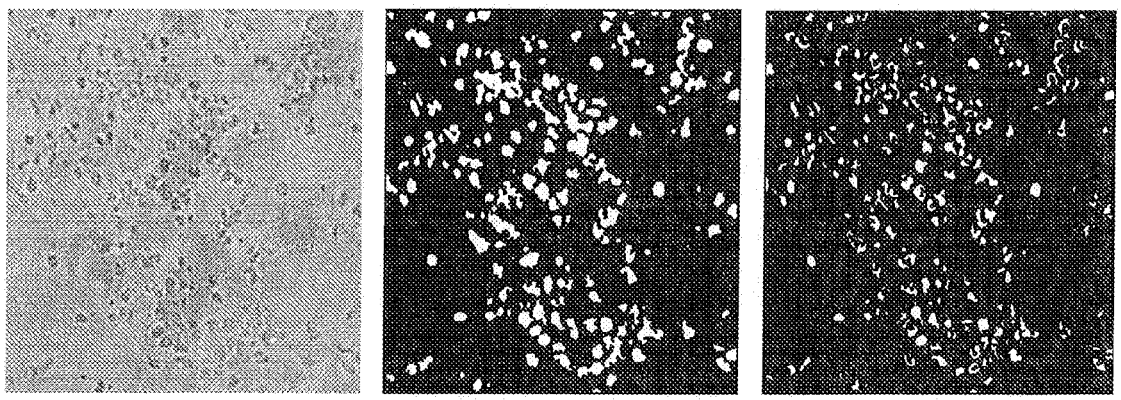
FIG. 5 shows Laplacian and Gaussian-filtered input data, a less restrictive mask and a restrictive mask.

To generate the restrictive mask in the labeling unit 12, the less restrictive mask is subjected to a labeling with respect to determining the local grey values of each one of the locally defined regions or clusters and the median grey values of the respective regions determined, after which the grey values obtained in each cluster are subjected to a discrimination with a preset threshold value. This threshold value is calculated from the respective data median value of the Laplace-filtered data within each individual cluster of the less restrictive mask. A coherent white or bright region in the less restrictive mask is thereby viewed as a cluster. The Laplace and Gaussian-filtered input data according to the central representation of FIG. 4 are shown on the left in FIG. 5. The less restrictive mask is shown in FIG. 5, in the center. The combination of the Laplace and Gaussian-filtered input data and the less restrictive mask results in the restrictive mask which is shown on the right in FIG. 5.

Figure 6A:
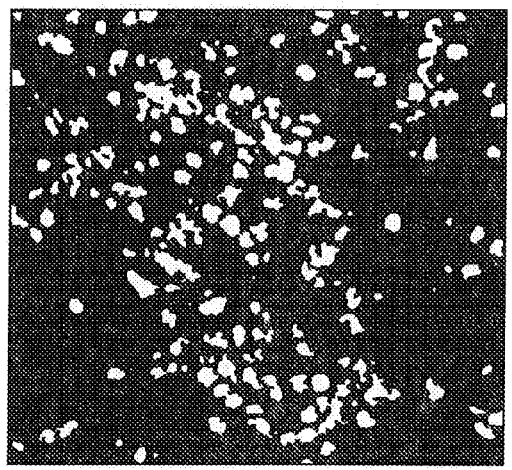
FIGS. 6A, 6B and 6C show a less restrictive mask, a labeled, less restrictive mask and a Laplace-filtered image data, respectively.
Figure 6B:
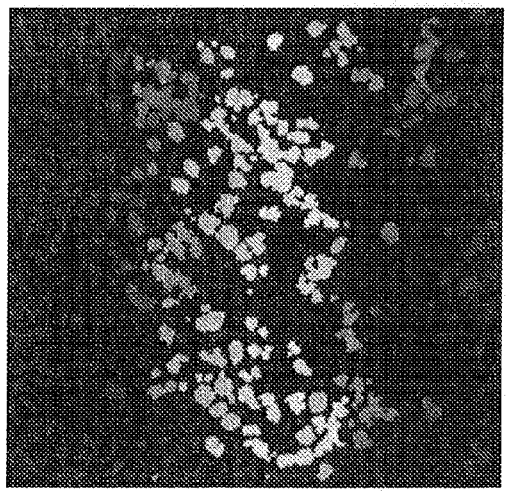

According to FIG. 6, an ascending number is allocated to the image points of each individual coherent region in the less restrictive mask for the labeling. This method enables a subsequent, separate processing or analysis of each individual region. The label image is shown in FIG. 6B. Ascending numbers are allocated to the individual regions, said numbers being shown in the colors from dark blue (side edges) to dark red (middle region) corresponding grey values in FIG. 6B.

Figure 6C:
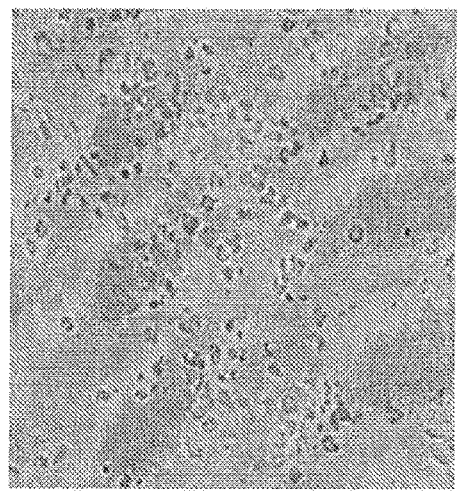

Each individual region of FIG. 6B is placed in succession over the spatially corresponding, Laplace-filtered image data according to FIG. 6C. The median value is calculated from the Laplace-filtered image data for each individual region. Each of these values then serves as threshold value for the respective region. By applying the individual threshold values to the respectively corresponding regions in the Laplace image, a restrictive mask is derived from the less restrictive mask.

The segmentation starting points not contained in the less restrictive mask are subsequently removed. This takes place by a corresponding comparison of the less restrictive mask with the mask having the already ascertained segmentation starting points in the comparator 13.

In the following, a growth proceeding from the segmentation starting points present in the individual regions is then undertaken within the regions of the restrictive mask in the growing unit 14, followed by a growth of the regions obtained in the less restrictive mask. In this way, a good segmentation of the brightness distributions already present in the image data obtained at the start is obtained.

Figure 7:
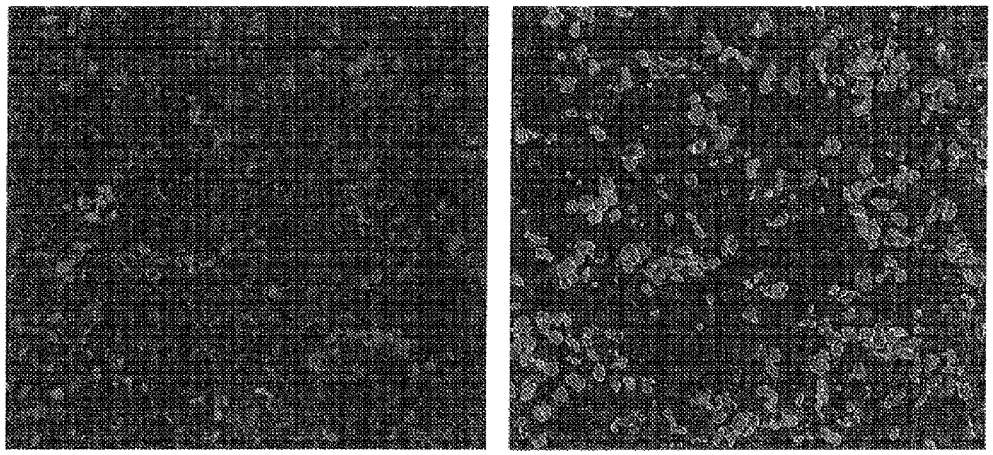
FIG. 7 shows the mask of the input data and the segmentation mask.

The growth of the regions left to grow in the less restrictive mask can then be continued in the foreground mask. It was shown that the regions left to grow in the foreground mask largely approximate the original distribution. In FIG. 7, the input mask, i.e. the mask of FIG. 1, is shown on the left. On the right in FIG. 7, the segmented input data are shown after a growth in the foreground mask has been undertaken.

If individual segmentation starting points are not present in the restrictive segmentation mask, then the restrictive segmentation mask can be modified prior to the start of the dilation process.

The process steps 100 for the dilation of segmentation starting regions in a given segmentation mask, i.e. the restrictive mask, are shown in FIG. 8. In step 120, a result of the segmentation at the moment (t-1) is obtained. Subsequently, a dilation of the segmentation at approximately or greater than the moment t is performed. Step 130. The regions to be modified are determined. Step 140. Two data sets are provided to a subtractor and a comparator determines if the difference is zero. Steps 150 and 160. If not, the results are saved (step 170) and returned to step 120. The result of this processing are true to form segmented input data (step 180 of FIG. 8).

The segmented regions shown on the right in FIG. 7 can then be interactively filtered, e.g. also with a defined surface content, grey value or probability threshold value to improve its further processing or further evaluation.

Diverse parameters of the shown nuclei, brightness or probability distributions, particle sizes, etc. can be calculated from these segmented representations or data.

The segmented input data are issued visually, e.g. on a screen, or printed out or perhaps stored with the calculated parameters.

Figure 9:
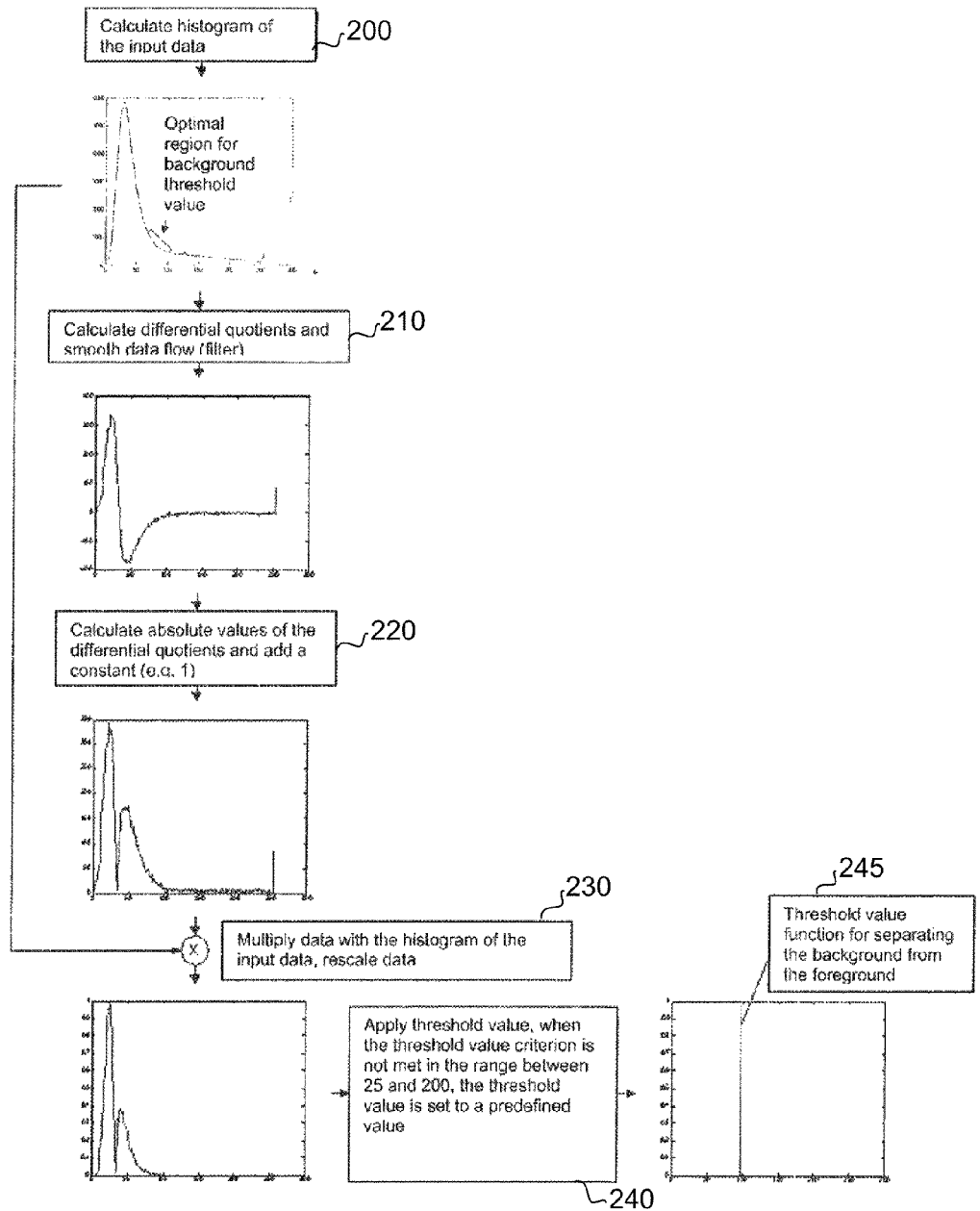
FIG. 9 shows the flow diagram relating to the determination of the threshold value for separating the foreground data from the background data.

To calculate a background threshold value for separating the input data into a background and foreground region in the discriminator 3, one proceeds as shown in FIG. 9. The dark image regions are accepted as background and the bright image regions as foreground. In the right image of FIG. 1, the intensity or brightness histogram of the input data is shown in which the optimal region for the background threshold value is first marked accordingly. This threshold value is determined with aid of a method described in greater detail with reference to FIG. 7 by an analytical processing and treatment of the brightness data distribution diagram, in particular histogram, of the input data.

For this purpose, it is advantageously provided that a histogram, in particular a brightness histogram, of the input data is generated (step 200 of FIG. 9) for separating the input data into bright foreground data and dark background data, the differential quotient of the smoothed histogram is calculated (step 210 of FIG. 9), the absolute values of the differential quotients is calculated and optionally a constant value added (step 220 of FIG. 9), the data obtained multiplied with the input data and optionally rescaled (step 230 of FIG. 9), and that that value is selected as a threshold value at which the function obtained is zero or approximates this value (steps 240 and 245 of FIG. 9).

By using the calculated optimal threshold value on the input data, the background is separated as best as possible from the regions relevant for the segmentation, i.e. the foreground or the foreground data. The mask with which the background of the input data can be separated from the foreground is shown in FIG. 2. Only the foreground region of the input data is then relevant for the further processing steps or the further segmentation.

The device according to the invention can be realized with hardware components to obtain high calculating speeds.

The filters used can be of various types. Advantageously, conventional low-pass filters or high-pass filters or Gaussian filters and Laplace filters are suitable. The use of filters acting in the same manner can be easily done.

The threshold values are selected depending on the desired accuracy or the desired data separation and must be specifically set. The correlating processes can, for example, consist of a weighted addition of the data or of a multiplication, perhaps also of a division or other linking of the data, if a corresponding increased variability of the data is obtained with the correlation.

The invention was described with reference to the evaluation of brightness values or determination of grey values. When evaluating data fields, the values contained in the data field and derived from other parameters, or determined values replace these values. The evaluation can also be based on chromatic values in a comparable manner.

The invention claimed is:

1. A method for a segmentation of locally defined, two-dimensional regions, the method which comprises:
    separating input data acquired from an image region under investigation into a foreground mask containing foreground data corresponding to larger or higher values, and a background mask containing background data corresponding to lower values by applying a first threshold value;
    subjecting the input data to two different filtering operations to determine segmentation starting points, with a filter reducing sharp contours or contrasts, and a filter for determining local maxima in a region;
    subtracting the data sets resulting from the two different filtering operations and defining image regions having a first specific threshold value or threshold value range as segmentation starting points;
    generating a less restrictive mask by subjecting the input data to a filtering operation accentuating high-frequency parts or a filtering operation detecting edges, and applying a second specific threshold value to the data resulting from the filtering operation, and correlating the data set obtained by applying the second specific threshold value to the data resulting from the filtering operation with the foreground data of the foreground mask;
    generating a restrictive mask by subjecting the less restrictive mask to a labeling with respect to a determination of local values of each individual locally defined region or cluster, and determining median values of the respective locally defined regions, and subjecting the values obtained in the labeling for each cluster to a discrimination with a preset threshold value;
    eliminating segmentation starting points not contained in the less restrictive mask;
    effecting a growth in the respective locally defined regions of the restrictive mask proceeding from the individual segmentation starting points;
    continuing a growth of these locally defined regions in the less restrictive mask; and
    viewing the locally defined regions obtained in the restrictive mask as segmented brightness regions.

2. The method according to claim 1, which comprises segmenting brightness distributions for showing nuclei agglomerates or unions, or particle size distribution within a sample under investigation.

3. The method according to claim 1, wherein the separating step comprises defining the foreground mask and the background mask according to brightness values.

4. The method according to claim 1, wherein the two different filtering operations include a low-pass filter and a local maximum filter and wherein the input data are correlated with the foreground mask.

5. The method according to claim 4, wherein the low-pass filter is a Gaussian filter and the input data are multiplied with the foreground mask.

6. The method according to claim 1, wherein the second specific threshold value for the filtering operations is a value zero.

7. The method according to claim 1, wherein the less restrictive mask is generated after a median filtration and/or a Gaussian filtration and the filtering operation detecting edges is effected with a high-pass filter.

8. The method according to claim 7, wherein the high-pass filter is a Laplace filter.

9. The method according to claim 1, wherein the labeling is effected with respect to a determination of grey values, the median values are grey values, and the grey values in each cluster are subjected to a discrimination with a preset threshold value.

10. The method according to claim 1, which comprises continuing the growth in the less restrictive mask and subsequently in the foreground mask; and
    viewing the locally defined regions obtained in the foreground mask as the segmented brightness regions.

11. The method according to claim 1, which comprises using a single or multi-step dilation on the ascertained segmentation starting points.

12. The method according to claim 9, which comprises discriminating with a preset grey value when grey values or a grey value mask is discriminated during labeling.

13. The method according to claim 5, which comprises correlating or adjusting a filter size of the local maximum filter to a size of the Gaussian filter.

14. The method according to claim 1, which comprises:
    to separate the input data, generating a diagram showing a data distribution of the input data;
    calculating differential quotients of a smoothed diagram showing the data distribution;
    calculating absolute values of the differential quotients and, optionally, adding a constant value;
    correlating the data thus obtained with the input data and, optionally, rescaling the data; and
    selecting that value as threshold value at which a function obtained corresponds to a third specific threshold value or has come close to the third specific threshold value.

15. The method according to claim 14, which comprises separating the input data into bright foreground data and dark background data and showing the data distribution in a brightness histogram.

16. The method according to claim 1, which comprises reproducing the representations or images and also segmented nuclei or nuclei agglomerates which are brightly colored in comparison to other cell regions or in comparison to a cytoplasm.

17. The method according to claim 1, which comprises segmenting colored nuclei or nuclei agglomerates contained in tissue slices.

18. A device for a segmentation of locally defined, two-dimensional regions, the device comprising:
    a discriminator connected to receive input data related to an image region under investigation and configured to separate the input data into a foreground mask containing foreground data corresponding to greater values and a background mask containing background data corresponding to lower values;

a filter unit connected to said discriminator and configured to determine segmentation starting points by subjecting the input data to two different filtrations, said filter unit including a filter for reducing sharp contours or contrasts, and a local maximum filter;

a subtraction unit connected to said filter unit for subtracting the data sets resulting from the two different filtrations, and for determining, storing, and/or making available for further calculation, the image regions having a first specific threshold value or threshold value range;

a filter for generating a less restrictive mask by detecting edges or accentuating the high-frequency parts of the input data;

a labeling unit for generating a restrictive mask, said labeling unit subjecting the less restrictive mask to a labeling with respect to a determination of the local values of each individual locally defined region or cluster, and wherein the median values of the respective locally defined regions are determined, whereby the values obtained in the labeling unit for each cluster are subjected to a discrimination with a preset threshold value;

a comparator connected to said filter and configured to remove segmentation starting points not contained in the less restrictive mask;

a growing unit connected to said comparator, said growing unit undertaking a growth in the respective locally defined regions of the restrictive mask proceeding from individual segmentation starting points, and continuing the growth of these locally defined regions in the less restrictive mask, and, optionally, subsequently continuing the growth of the regions left to grow in the less restrictive mask in the foreground mask; and at least one further unit selected from the group consisting of a storage unit, a display unit, and a further evaluation unit for storing, displaying, and/or further processing the locally defined regions obtained in the restrictive mask, or in the continued growth regions of the foreground mask, as the desired segmented brightness regions.

19. The device according to claim 18, wherein the device is configured to:

separate input data acquired from an image region under investigation into a foreground mask containing foreground data corresponding to larger or higher values, and a background mask containing background data corresponding to lower values by applying a first threshold value;

subject the input data to two different filtering operations to determine segmentation starting points, with a filter reducing sharp contours or contrasts, and a filter for determining local maxima in a region;

subtract the data sets resulting from the two different filtering operations and defining image regions having the first specific threshold value or threshold value range as segmentation starting points;

generate a less restrictive mask by subjecting the input data to a filtering operation accentuating high-frequency parts or a filtering operation detecting edges, and applying a second specific threshold value to the data resulting from the filtering operation, and correlating the data set obtained by applying the second specific threshold value to the data resulting from the filtering operation with the foreground data of the foreground mask;

generate a restrictive mask by subjecting the less restrictive mask to a labeling with respect to a determination of local values of each individual locally defined region or cluster, and determining median values of the respective locally defined regions, and subjecting the values obtained in the labeling for each cluster to a discrimination with a preset threshold value;

eliminate segmentation starting points not contained in the less restrictive mask;

effect a growth in the respective locally defined regions of the restrictive mask proceeding from the individual segmentation starting points;

continue a growth of these locally defined regions in the less restrictive mask; and view the locally defined regions obtained in the restrictive mask as segmented brightness regions.

20. The device according to claim 18, configured for segmentation of brightness distributions or regions, in particular for showing nuclei agglomerates or unions, particle size distribution, or data fields.

21. The device according to claim 18, wherein the foreground mask contains brightness values, and the background mask contains dark values.

22. The device according to claim 18, wherein said filter for reducing sharp contours or contrasts is a low-pass filter.

23. The device according to claim 22, wherein said low-pass filter is a Gaussian filter.

24. The device according to claim 18, wherein said filter for generating a less restrictive mask is a high-pass filter.

25. The device according to claim 24, wherein said filter for generating a less restrictive mask is a Laplace filter.

26. The device according to claim 25, wherein a median filter and/or Gaussian filter is connected upstream of said Laplace filter and a correlator connected downstream thereof, for subjecting the data to a threshold value application with a second specific threshold value and the data set obtained therewith is correlated with the data of the foreground mask.

27. The device according to claim 18, which comprises a single-step dilation unit for the segmentation starting points.

28. The device according to claim 18, wherein:

said discriminator comprises a diagram component showing a data distribution for the input data;

a differential quotient component is provided for a smoothed diagram, said component calculating absolute values of the differential quotients and optionally adding a constant value;

a correlator is provided for linking the data obtained from the differential quotient component with the input data; and a threshold component is provided for selecting that value as threshold value at which a function assumes a second specific threshold value or has come close to the second specific threshold value.

29. The device according to claim 28, wherein said diagram component is a histogram component and the input data are separated into bright foreground data and dark background data, said correlator is a multiplier, and at least one of said first specific threshold value and said second specific threshold value is zero.

30. The device according to claim 28, wherein the elements of the device are configured in a computer with corresponding hardware and software.

31. A method for segmentation of nuclei or nuclei agglomerates which are colored dark in comparison to other cell regions or in comparison to the cytoplasm, and/or of colored nuclei or nuclei agglomerates contained in tissue slices, which comprises:

providing a device for a segmentation of locally defined, two-dimensional regions, the device including:

a discriminator connected to receive input data related to an image region under investigation and configured to separate the input data into a foreground mask containing foreground data corresponding to greater values and a background mask containing background data corresponding to lower values;

a filter unit connected to said discriminator and configured to determine segmentation starting points by subjecting the input data to two different filtrations, said filter unit including a filter for reducing sharp contours or contrasts, and a local maximum filter;

a subtraction unit connected to said filter unit for subtracting the data sets resulting from the two different filtrations, and for determining, storing, and/or making available for further calculation, the image regions having a first specific threshold value or threshold value range;

a filter for generating a less restrictive mask by detecting edges or accentuating the high-frequency parts of the input data;

a labeling unit for generating a restrictive mask, said labeling unit subjecting the less restrictive mask to a labeling with respect to a determination of the local values of each individual locally defined region or cluster, and wherein the median values of the respective locally defined regions are determined, whereby the values obtained in the labeling unit for each cluster are subjected to a discrimination with a preset threshold value;

a comparator connected to said filter and configured to remove segmentation starting points not contained in the less restrictive mask;

a growing unit connected to said comparator, said growing unit undertaking a growth in the respective locally defined regions of the restrictive mask proceeding from individual segmentation starting points, and continuing the growth of these locally defined regions in the less restrictive mask, and optionally, subsequently continuing the growth of the regions left to grow in the less restrictive mask in the foreground mask; and at least one further unit selected from the group consisting of a storage unit, a display unit, and a further evaluation unit for storing, displaying, and/or further processing the locally defined regions obtained in the restrictive mask, or in the continued growth regions of the foreground mask, as the desired segmented brightness regions; and carrying out the functional steps required for the segmentation of the nuclei or nuclei agglomerates.

32. A computer program product having program code stored on a non-transitory computer-readable data medium for carrying out the method according to claim 1 when the program product is executed on a computer.

\* \* \* \* \*